United States Patent [19]

Kawabata et al.

[11] Patent Number: 4,776,075

[45] Date of Patent: Oct. 11, 1988

[54] METHOD FOR MANUFACTURING PISTON OF INTERNAL COMBUSTION ENGINE

[75] Inventors: Yasuhiro Kawabata, Anjo; Naoki Minamoto, Toyota; Soichi Hara, Chiryu; Takanori Kamiya, Anjo, all of Japan

[73] Assignee: Aisin Seiki Kabushiki Kaisha, Kariya, Japan

[21] Appl. No.: 66,714

[22] Filed: Jun. 26, 1987

[30] Foreign Application Priority Data

| | | | |
|---|---|---|---|
| Jun. 27, 1986 | [JP] | Japan | 61-152288 |
| Jun. 27, 1986 | [JP] | Japan | 61-99569 |

[51] Int. Cl.⁴ ..... B23P 15/10

[52] U.S. Cl. ..... 29/156.5 R; 29/418; 164/98; 164/132; 123/41.35; 123/193 P; 123/196 R

[58] Field of Search ..... 29/156.5 R, 418; 123/41.35, 193 P, 196 R; 164/69.1, 70.1, 98, 132

[56] References Cited

U.S. PATENT DOCUMENTS

| | | | |
|---|---|---|---|
| 3,459,253 | 8/1969 | Woolcott | 164/132 X |
| 4,491,168 | 1/1985 | Snee | 164/98 |

FOREIGN PATENT DOCUMENTS

| | | | |
|---|---|---|---|
| 1149504 | 5/1963 | Fed. Rep. of Germany . | |
| 1483641 | 2/1969 | Fed. Rep. of Germany . | |
| 1783076 | 11/1970 | Fed. Rep. of Germany . | |
| 2435377 | 2/1976 | Fed. Rep. of Germany | 123/41.35 |
| 2458290 | 6/1976 | Fed. Rep. of Germany | 164/98 |
| 117862 | 9/1981 | Japan | 164/132 |
| 90959 | 5/1985 | Japan | 123/41.35 |
| 166158 | 8/1985 | Japan | 164/132 |
| 227964 | 11/1985 | Japan | 164/98 |
| 769529 | 3/1957 | United Kingdom | 29/156.5 |

*Primary Examiner*—Carl E. Hall
*Assistant Examiner*—Andrew E. Rawlins
*Attorney, Agent, or Firm*—Oblon, Fisher, Spivak, McClelland & Maier

[57] ABSTRACT

A method for manufacturing a piston of an internal combustion engine, especially for forming a piston gallery portion provided in the piston head for cooling the engine. A gallery member made of a metal pipe having a high thermal conductivity or a salt-core having a shape corresponding to the piston gallery is fixed to a fixing member having a peripheral rim and a plurality of fixing legs extended from the rim. The gallery member or the salt-core fixed to the fixing member is cast in the piston, body, and then, the fixing member is cut off from the piston body. The salt-core is melted away by pouring water. By this method, a piston of light weight and having high cooling efficiency can be manufactured.

4 Claims, 2 Drawing Sheets

METHOD FOR MANUFACTURING PISTON OF INTERNAL COMBUSTION ENGINE

BACKGROUND OF THE INVENTION

1. Field of the Invention

This invention relates to a method for manufacturing a piston of internal combustion engine, particularly to a method for forming a gallery portion of the piston.

2. Prior Art

A conventional gallery segment provided in the top of an internal combustion engine piston for the purpose of cooling is disclosed, for example, in Japanese Utility Model Publication No. 52346 of 1983. This conventional gallery segment comprises a piston-cooling cavity and ring lands that are integrally formed beforehand, and is cast in a piston body when the piston is founded. The gallery segment is made of cast iron or wear-resistant metal such as Ni-resist. Usually, however, an oil gallery portion does not require high wear-resistance. The use of such a costly wear-resistant material as Ni-resist with low thermal conductivity not only has substantially lowered the cooling effect but also resulted in cost increase.

Moreover, in such a conventional device, the wall thickness becomes large enough to provide a full gallery inside capacity and a larger gallery is required to secure the same degree of cooling effect as in a device made of aluminum. This in turn increases the size and weight of the piston.

SUMMARY OF THE INVENTION

The object of the present invention is to provide an improved method for forming an oil gallery portion of engine piston which can prevent the lowering of cooling effect and achieve substantial cost reduction.

The further object of the present invention is to provide an improved method for forming a gallery portion of engine piston which does not increase the weight of piston and can avoid the use of low thermal conductivity material.

In accordance with the present invention, a special fixing member is used in the process of forming the gallery portion. This special fixing member is made of metal such as steel and comprises a peripheral rim member and a plurality of fixing legs extended inward from the peripheral rim member and having a circularly curved tip.

In one embodiment of the present invention, there are used a gallery member made of a metal having high thermal conductivity and formed as an annularly curved pipe with both ends thereof joined together and a fixing member comprising a peripheral rim and a plurality of fixing legs extended inward from the peripheral rim and having a circularly curved tip. The gallery member is fixed to the fixing legs of the fixing member and this assembly is cast in a piston body. Then the peripheral rim is cut off from the piston. Namely, as a gallery member to be cast in the piston body, a metal pipe having a high thermal conductivity is used by being fixed to a fixing member which is to be cut off later.

In a piston manufactured by this method, the gallery member having a high thermal conductivity facilitates the flow of heat around the ring grooves and thereby assures enhanced cooling effect. Further, this method eliminates the use of costly wear-resistant material for the gallery member and brings about significant cost reduction.

In another embodiment of this invention, a gallery portion can be formed directly when casting a piston body, with the use of a salt-core, without using any special gallery member. This is achieved by use of a salt-core and a fixing member which comprises a peripheral rim and a plurality of salt-core fixing legs extended inward therefrom. The salt-core is fixed to the fixing member and this assembly is cast in a piston body when the piston body is founded. After casting the piston, the piston head is processed by machining off the peripheral rim of the fixing member.

In a piston manufactured by this method, direct cooling is applied to the cylinder head, not by way of a gallery member having a low thermal conductivity, with a resulting increase in cooling efficiency. Moreover, machining off the peripheral rim of the fixing member avoids an undesirable increase of the weight of the piston body.

The foregoing and other objects, features and advantages of the present invention will be understood more clearly and fully from the following detailed description of preferred embodiments with reference to the attached drawings.

DESCRIPTION OF THE PREFERRED EMBODIMENTS

Figure 1:
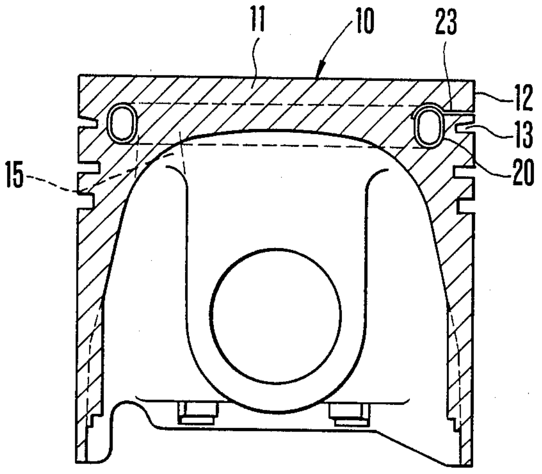
FIG. 1 shows a vertical cross-sectional view of a piston manufactured by a method according to the present invention.

A piston 10 shown in FIG. 1 has a piston head 11 having top land 12 and top ring groove 13, with a gallery member 20 cast therein by using a fixing member.

The gallery member 20 consists of an annularly bent pipe of an alufin-treated or aluminized material having a high thermal conductivity, with both ends thereof butt-welded together to attain hermetical sealing.

Figure 3:
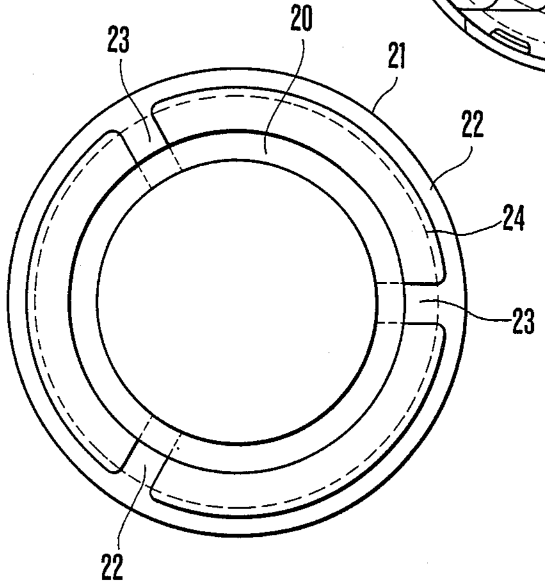
FIG. 3 is a plan view of a gallery member having a fixing legs used in making the piston shown in FIG. 1.

The fixing member 21, independent of ring groove 13, is made of steel plate consists of an annular peripheral rim 22 and a plurality of fixing legs 23 extended inward therefrom and having a circularly bent tip, as shown in FIG. 3. The gallery member 20 is welded to the fixing legs 23. The peripheral rim 22 of the fixing member 21 is for the purpose of setting a mold during casting. As such, the peripheral rim 22 is machined off, on completion of casting, to a circle indicated by a two-dot and dash line corresponding to the outside diameter 24 of the piston, and getting eliminated from the surface of the finished product.

Figure 2:
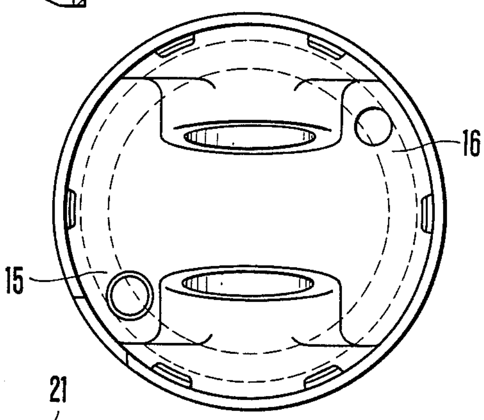
FIG. 2 is a bottom view of the piston shown in FIG. 1.

After the gallery member 20 has been cast in the head 11 of the piston, an oil inlet 15 and an oil outlet 16 are machined as shown in FIG. 2.

The heat applied to the head 11 of the piston 10 is conveyed to the gallery member 20 having a high thermal conductivity. Because the heat conveyed to the gallery member 20 is cooled by oil flowing therein through the oil inlet 15 and flowing thereout through the oil outlet 16, highly efficient cooling is maintained in the vicinity of the top ring groove 13.

Figure 4:
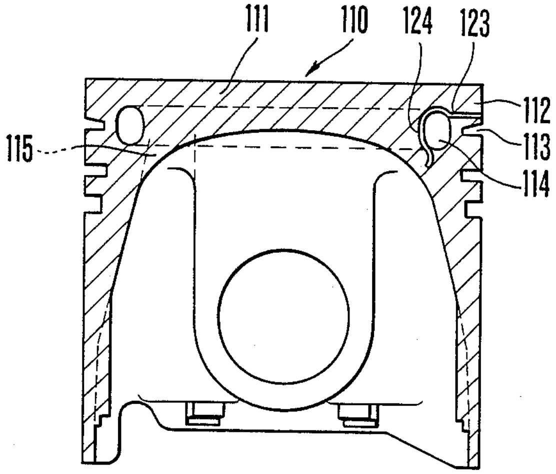
FIG. 4 shows a vertical cross-sectional view of another piston manufactured by another method according to this invention.

FIG. 4 shows the top of a piston 110 made by use of another preferred embodiment of this invention. In the head 111 are provided a top land 112, a top ring groove 113 and a gallery cavity 114 formed inside the top ring groove 113.

Figure 6:
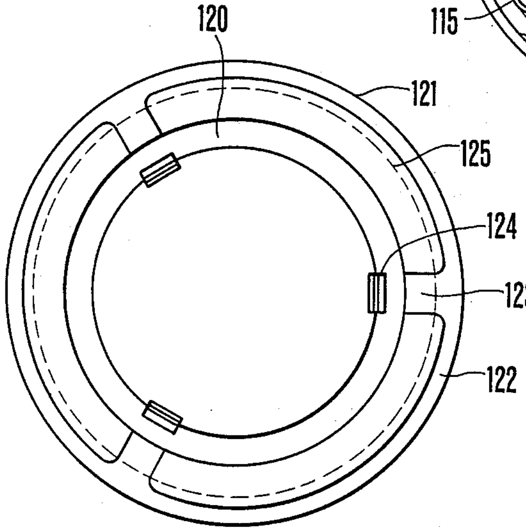
FIG. 6 is a plan view of a fixing member to which a salt-core is fixed, which is used in making the piston shown in FIG. 4.

The gallery cavity 114 is formed by performing casting with an annular salt-core 120 shown in FIG. 6 fixed to a fixing member 121.

The fixing member 121 made of aluminized steel plate comprises an annular peripheral rim 122 and a plurality of integral fixing legs 123 extended inward therefrom and having a S-shaped nail 124 at the tip thereof, as shown in FIGS. 4 and 6. The salt-core 120 is fixed on being snap-fitted to the nails 124 of the fixing legs 123. Intended for the purpose of mold setting, the peripheral rim 122 of the fixing member 121 is machined off on completion of casting to a circle indicated by a two-dot and dash line corresponding to the outside diameter 125 of the piston.

The salt-core 120 fixed to the fixing member 121 is cast in the piston body.

Figure 5:
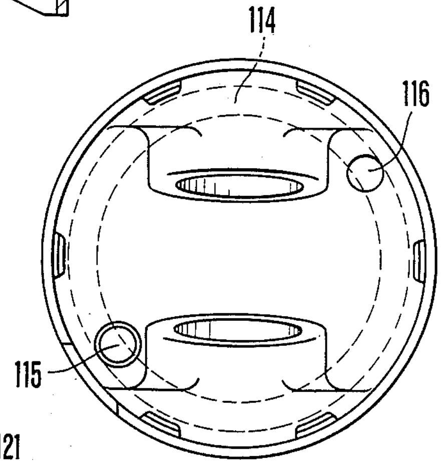
FIG. 5 is a bottom view of the piston shown in FIG. 4.

On completion of casting, oil ports 115 and 116 shown in FIG. 5 are drilled. Then water is poured in through the drilled oil ports 115 and 116 to melt away the salt-core 120, thereby forming the desired gallery cavity 114. Following this, the peripheral rim 122 of the fixing member 121 is machined off.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A method for manufacturing a piston of an internal combustion engine comprising:

fixing a piston gallery member made of an annularly curved pipe of a metal having a high thermal conductivity to fixing legs of a fixing member, said fixing member comprising a peripheral rim, a plurality of fixing legs extended inward from said peripheral rim and circularly bent portions formed at the tips of said fixing legs to fix said piston gallery member, setting said piston gallery member fixed to said fixing member in a mold, casting a piston body together with said piston gallery member, and cutting off said peripheral rim of the fixing member from the piston body.

2. A method of manufacturing a piston of an internal combustion engine comprising:

fixing a salt-core having a shape corresponding to a piston gallery portion to fixing legs of a fixing member, said fixing member comprising a peripheral rim, a plurality of fixing legs extending inward from said peripheral rim and circularly bent portions formed at the tips of said fixing legs to fix said salt-core member, setting said salt-core member fixed to said fixing member in a mold, casting a piston body together with said salt-core member, melting away said salt-core cast in the piston body by pouring water into the gallery portion of the piston, and cutting off said peripheral rim of the fixing member from the piston body.

3. The method of claim 1 wherein said fixing member is independent of any ring groove of said piston.

4. The method of claim 1 wherein said fixing member is independent of any ring groove of said piston.

* * * * *

UNITED STATES PATENT AND TRADEMARK OFFICE
CERTIFICATE OF CORRECTION

PATENT NO. : 4,776,075

DATED : October 11, 1988

INVENTOR(S) : KAWABATA ET AL

It is certified that error appears in the above-identified patent and that said Letters Patent is hereby corrected as shown below:

Column 4, line 40, please change "claim 1" to --claim 2--.

Signed and Sealed this

Sixteenth Day of May, 1989

*Attest:*

DONALD J. QUIGG

*Attesting Officer* *Commissioner of Patents and Trademarks*